J. S. BRADLEY.
PLATFORM COMPUTING SCALE.
APPLICATION FILED JULY 25, 1908.

909,746.

Patented Jan. 12, 1909.

2 SHEETS—SHEET 1.

Witnesses
Carl Stoughton
A. L. Phelps

Inventor
John Sturgus Bradley
By C. C. Shepherd
Attorney

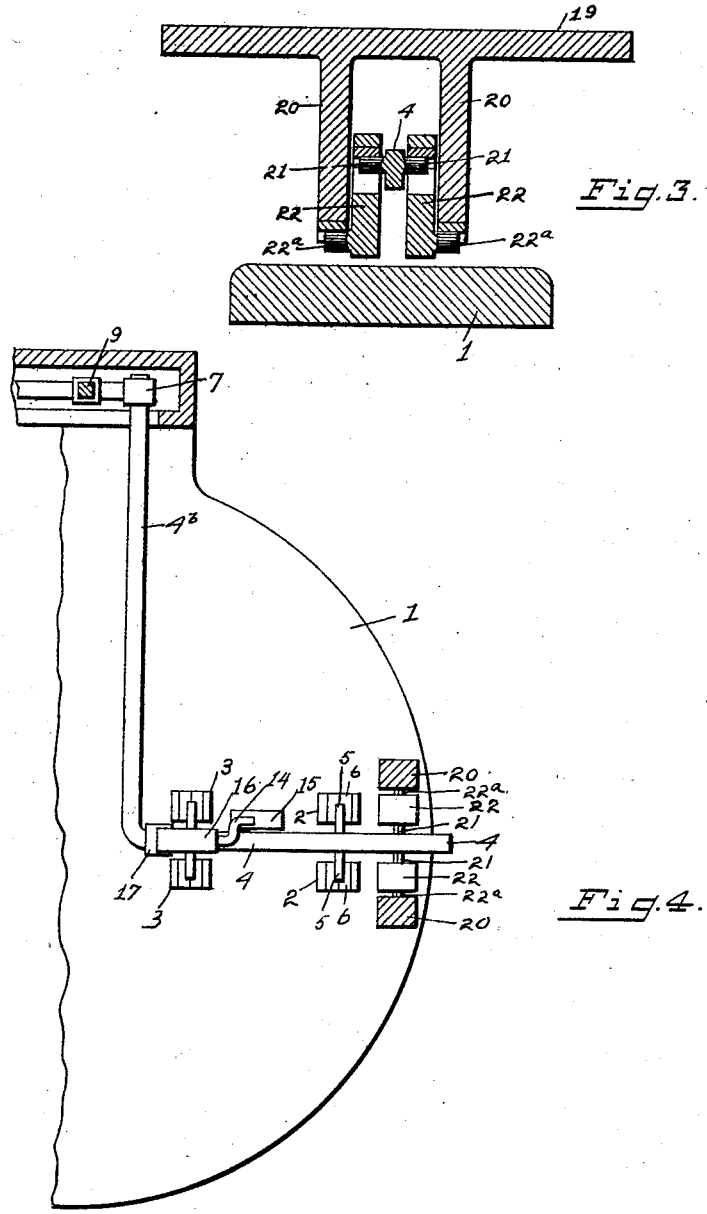

UNITED STATES PATENT OFFICE.

JOHN STURGUS BRADLEY, OF NEW CONCORD, OHIO.

PLATFORM COMPUTING-SCALE.

No. 909,746.  Specification of Letters Patent.  Patented Jan. 12, 1909.

Application filed July 25, 1908. Serial No. 445,340.

*To all whom it may concern:*

Be it known that I, JOHN STURGUS BRADLEY, a citizen of the United States, residing at New Concord, in the county of Muskingum and State of Ohio, have invented certain new and useful Improvements in Platform Computing-Scales, of which the following is a specification.

Figure 1:
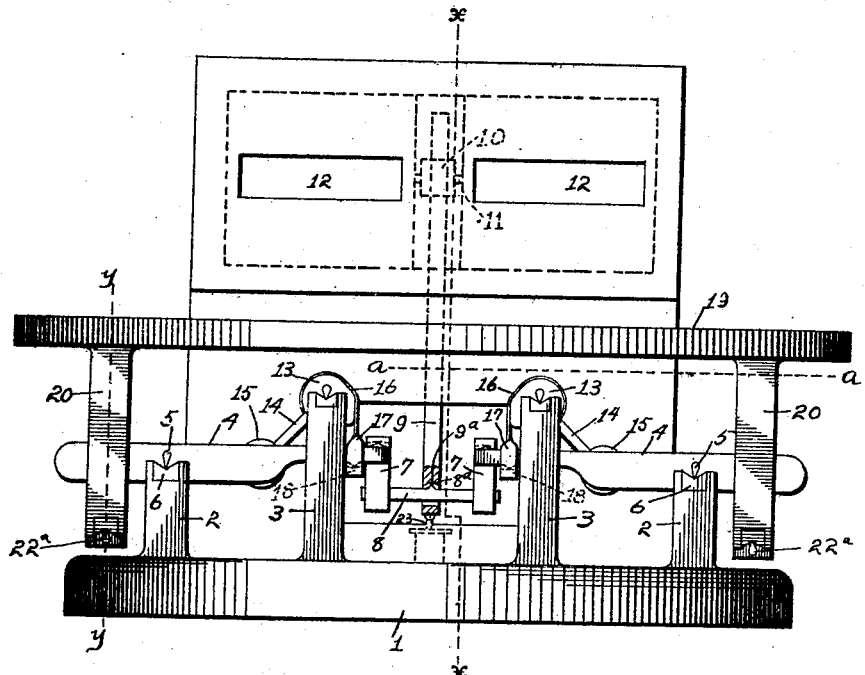
Figure 2:
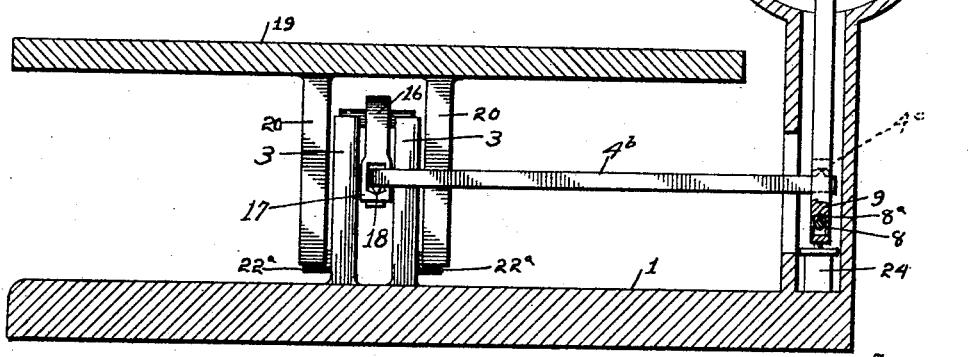

My invention relates to the improvement of platform computing scales, and the objects of my invention are to provide an improved construction of scales of this class embodying means for securing an accurate and reliable weight indication regardless of the position of the weight on the weighing platform, and to produce certain improvements in details of construction and arrangement of parts which will be more fully pointed out hereinafter. These objects I accomplish in the manner illustrated in the accompanying drawings, in which:

Figure 1 is a front elevation of my improved scales, Fig. 2 is a vertical section on line $x$—$x$ of Fig. 1, Fig. 3 is a sectional view on line $y$—$y$ of Fig. 1, and Fig. 4 is a sectional view on line $a$—$a$ of Fig. 1.

Similar numerals refer to similar parts throughout the several views.

1 represents the horizontal supporting base of the scales, from opposite sides of the center of which lie pairs of parallel bearing standards 2 and rising from the base 1 on the inner side of each of the standards 2 is a pair of vertical and parallel standards 3.

4 represents opposing scale beams each of said beams being provided at a point on the outer side of the center of its length, with oppositely located knife edge bearing projections 5, the lower edges of which bear in the upper side V-shaped surface of agate bearings 6 which are carried in the upper portions of the standards 2. On the inner sides of the standards 2, the scale beams extend between the standards 3 beyond which said scale beams are bent or turned rearwardly at right angles, thereby forming parallel rearwardly extending beam extensions 4$^b$. The rear end portion of each of the beam extensions 4$^b$ is provided with an upwardly projecting knife edge bearing 4$^c$ and these bearing projections contact with the upper sides of the upper end portions of a pair of parallel slotted hangers 7.

8 represents a horizontal equalizing rod, each of the outer end portions thereof being formed on its underside with a bearing projection which engages the lower side of the lower end portion of the corresponding hanger 7. The rod 8 is formed on its upper side and at the center of its length with a bearing projection 8$^a$ which engages or contacts with a V-shaped bearing 9$^a$ formed in the lower portion of an upwardly extending chart cylinder operating bar 9, the upper portion of said bar having its forward surface toothed and engaging with the teeth of a pinion wheel 10 which is carried on the usual horizontal shaft 11 of a rotary chart cylinder 12.

In the upper end of each of the sides 3 is pivoted a substantially cam shaped head 13 of a pendulum which comprises a rod 14 connected with said head and a weight 15 carried on the outer end of said rod. Connected with the rounded surface of each pendulum head 13 is one end of a flexible strap 16, the lower end portion of the latter carrying a hanger 17 in which the end of the corresponding beam 4 has an underside bearing as indicated at 18.

19 represents a horizontally disposed weighing tray which has depending therefrom on each side of its center a pair of vertical arms 20. Between the arms 20 of each pair, the beam 4 which is on the corresponding side of the segments, is provided with oppositely located bearing projections 21 on which are suspended the upper end portions of hangers 22, the lower ends of said hangers having laterally projecting bearing projections 22$^a$ which engage the undersides of the depending platform arms 20. The lower end of the chart cylinder operating bar 9 is provided with the usual piston extension 23 which carries a piston head in a dash pot 24 in the usual manner. As indicated in the drawing, each of the pendulums is normally inclined outwardly from a vertical position.

In operation, it will be understood that a weight placed on the platform 19 and a consequent downward movement of the arms 20, will result in the downward movement of the outer end portions of the beams 4 and in an upward movement of their extensions 4$^b$. In this movement of said beams, it is obvious that partial rotary motion will be imparted to the pivoted heads of the pendulums through the connection therewith of the inner end portions of the beams 4, which will result in a downward movement of the pendulum weights, the degree of which will be governed by the weight carried by the platform. Through the corresponding movement of the opposing beams 4 and their extensions and the connection of the hangers 7 with the equalizing bar 8 and the central contact of the latter with the operating bar 9, it is obvious that a straight vertical upward movement will be imparted to said operating bar, which through the engagement of its rack portion with the pinion 10, will impart the desired rotation to the chart shaft 11. The employment of the opposing scale beams and duplicate pendulums of equal weight and the connection of said beams with the ends of the equalizing bar, must result as will readily be seen in imparting the same degree of upward movement to the operating bar 10 when a weight is supported on the platform centrally or at one side of the center thereof, thereby insuring a uniform and accurate operation of the operating bar regardless of the position of the weight applied to the platform.

What I claim, is:

1. In a weighing mechanism, the combination with a base, and a pair of opposing scale beams fulcrumed above said base, of an equalizing bar connecting said beams, an indicator operating bar engaged centrally by said equalizing bar, and a weighing platform carried by said beams on the outer sides of their fulcrum points.

2. In a weighing mechanism, the combination with a base, a pair of opposing beams fulcrumed above said base, a swinging and normally outwardly inclined pendulum for each of said beams, and connections between said beams and pendulums, of an equalizing bar pivotally connecting said beams, an indicator operating bar contacting centrally with said equalizing bar, and a platform supported by said beams on the outer sides of their fulcrum points.

In testimony whereof I affix my signature in presence of two witnesses.

JOHN STURGUS BRADLEY.

Witnesses:
L. CARL STOUGHTON,
C. C. SHEPHERD.